United States Patent
Shimizu et al.

(10) Patent No.: US 6,473,458 B1
(45) Date of Patent: Oct. 29, 2002

(54) METHOD FOR ENCODING AND DECODING MOVING VECTOR, ENCODER AND DECODER FOR MOVING VECTOR, AND RECORDING MEDIUM STORED WITH ENCODING AND DECODING PROGRAMS FOR MOVING VECTOR

(75) Inventors: Atsushi Shimizu, Tokyo (JP); Hirohisa Jozawa, Tokyo (JP); Kazuto Kamikura, Tokyo (JP); Hiroshi Watanabe, Tokyo (JP); Atsushi Sagata, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/254,275
(22) PCT Filed: Jul. 9, 1998
(86) PCT No.: PCT/JP98/03075
 § 371 (c)(1),
 (2), (4) Date: Mar. 3, 1999
(87) PCT Pub. No.: WO99/03284
 PCT Pub. Date: Jan. 21, 1999

(30) Foreign Application Priority Data

Jul. 9, 1997 (JP) .............................................. 9-183987

(51) Int. Cl.[7] .............................................. H04N 11/02
(52) U.S. Cl. ................................................ 375/240.11
(58) Field of Search .......................... 348/442; 342/25, 342/196; 375/240.17, 240.11

(56) References Cited

U.S. PATENT DOCUMENTS 4,890,160 A * 12/1989 Thomas ....................... 358/105
5,677,693 A * 10/1997 Frankot et al. ................ 342/25
5,686,922 A * 11/1997 Stankwitz et al. ........... 342/196
2001/0043653 A1 * 11/2001 Hosaka ................... 375/240.16

FOREIGN PATENT DOCUMENTS

WO     WO99/03284     1/1999

OTHER PUBLICATIONS

New Japan ITU Association, "ITU–T White Book–Audio Visual/Multi–media related (H series) Recommendations", pp. 358–359 (Feb. 1995).
A. Shimizu, et al., "A Study on Motion Vector Representation Using Norm and Angle Components", NTT Human Interface Laboratories, pp. 67–68 (1997).
A. Shimizu, et al., "Motion Vector Representation Using Norm and Angle Components", NTT Human Interface Laboratories, pp. 132 (1997).

* cited by examiner

Primary Examiner—Chris Kelley
Assistant Examiner—George A Bugg
(74) Attorney, Agent, or Firm—Burns, Doane, Swecker & Mathis, L.L.P.

(57) ABSTRACT

Motion vector encoding and decoding methods, motion vector encoding and decoding apparatuses, and storage media storing motion vector encoding and decoding programs are provided, thereby reducing the amount of generated code with respect to the motion vector. First, the motion vector of a target block to be encoded is detected (step S1), and a prediction error vector is calculated (step S2). After the length component of the motion vector is calculated (step S3), the length component is variable-length-encoded (step S4). The length component is checked (step S5), and if the length component is not 0, the direction component is calculated (step S6). The table for encoding the direction component is selected according to the length component, and the direction component is encoded (step S7).

54 Claims, 8 Drawing Sheets

METHOD FOR ENCODING AND DECODING MOVING VECTOR, ENCODER AND DECODER FOR MOVING VECTOR, AND RECORDING MEDIUM STORED WITH ENCODING AND DECODING PROGRAMS FOR MOVING VECTOR

TECHNICAL FIELD

The present invention relates to motion vector encoding and decoding methods, motion vector encoding and decoding apparatuses, and storage media storing motion vector encoding and decoding programs. These methods, apparatuses, and storage media are applied to a motion-picture encoding method using motion-compensating interframe prediction.

BACKGROUND ART

The interframe predictive coding method for motion pictures (i.e., video data) is known, in which an already-encoded frame is used as a prediction signal so as to reduce temporal redundancy. In order to improve the efficiency of the time-based prediction, a motion-compensating interframe prediction method is used in which a motion-compensated picture signal is used as a prediction signal. The motion vector necessary for motion compensation in the decoding operation is encoded and transmitted to the decoding side.

Generally, the motion compensation is executed for each unit area such as a block, and each area has an individual motion vector. It is known that the motion vectors belonging to neighboring areas have a higher correlation. Therefore, in practice, the motion vector of an area to be encoded is predicted based on the motion vector of an area which neighbors the area to be encoded, and a prediction error is transmitted so as to reduce the redundancy of the motion vector. The following explanations refer to the moving-picture coding method ISO/IEC 11172-2 (MPEG-1) as an example. In MPEG-1, the motion compensation is performed for each block, and the motion vector of a block to be encoded (i.e., a target block) is predicted based on the motion vector of the block immediately before the target block. The motion vector used in MPEG-1 is defined in an orthogonal coordinate system, and has horizontal component x and vertical component y. The prediction errors Xd and Yd of these components are calculated using the following equations.

$$x_d = x_i - x_{i-1} \tag{1}$$

$$y_d = y_i - y_{i-1} \tag{2}$$

where $x_i$ and $y_i$ are components of the motion vector of the target block, and $x_{i-1}$ and $y_{i-1}$ are components of the motion vector of the block immediately before the target block.

In general motion pictures, as shown in FIG. 11, distributions of the prediction error components x and yi are respectively concentrated near zero; therefore, variable-length encoding in which the shortest code length is "0" is performed, and encoded data are transmitted to the decoding side.

When decoding the motion vector, the prediction error which was variable-length-encoded is extracted from the encoded data sequence, and the motion vector of the target block to be decoded is decoded by adding the prediction error to the motion vector of the block which was previously decoded. See the following equations.

$$x_i = x_{i-1} + x_d \tag{3}$$

$$y_i = y_{i-1} + y_d \tag{4}$$

where $x_i$ and $y_i$ are components of the motion vector of the target block, and $x_{i-1}$ and $y_{i-1}$ are components of the motion vector of the block which was decoded immediately before the target block.

FIG. 12 shows the distribution of a difference vector in general motion pictures. As shown in FIG. 12, the distribution of the vector indicating the prediction error is concentrated to the origin (0, 0).

In order to shorten the length of code near the origin (0, 0) in the conventional method, short codes must be assigned to both horizontal and vertical components near "0". This means that short codes are also assigned to the vectors near the X and Y axes. Here, the example code lengths assigned to each vector in the conventional method are shown in FIG. 13. When comparing FIG. 13 with FIG. 12, it is clear that the assignment of code does not agree with the actual distribution of the difference vector.

As explained above, the conventional method has a problem in which it is impossible to efficiently assign codes based on the distribution of the difference vector.

Therefore, the objective of the present invention is to provide motion vector encoding and decoding methods to reduce the amount of generated code with respect to the motion vector.

DISCLOSURE OF INVENTION

The present invention relates to the motion vector predictive encoding method, the motion vector predictive encoding apparatus, and the motion vector predictive encoding program stored in a computer-readable storage medium, which are applied to the motion-picture encoding method using the motion-compensating interframe prediction. In the present invention, when a motion vector is encoded, the vector is represented using a coordinate system, such as polar coordinates, consisting of length and direction components of the vector, and each component is encoded. If the motion vector to be encoded is represented using an orthogonal coordinate system, the motion vector is converted to have length and direction components, and then each component is encoded.

The possible values for the direction component change depending on the length component; thus, the table used for encoding the direction component is changed according to the length component. Therefore, the direction component is encoded after the length component is encoded.

The length component may be one of the sum of absolute values, the sum of squares, the square root of the sum of squares, and the maximum value with respect to components of the motion vector in an orthogonal coordinate system. The following are examples for calculating the length component of the vector.

Sum of absolute values (refer to FIG. 8)

$$r_{abs} = |x| + |y| \tag{5}$$

Sum of squares (refer to FIG. 9)

$$r_{sqr} = x^2 + y^2 \tag{6}$$

Square root of the sum of squares (refer to FIG. 9: in this case, each value in the brackets indicates r)

$$r_{sqr} = \sqrt{(x^2+y^2)} \quad (7)$$

Maximum value (refer to FIG. 10)

$$r_{max} = \max(x, y) \quad (8)$$

In the above equations (5) to (8), x indicates the horizontal component of the vector, while y indicates the vertical component of the vector. In addition, the calculating method to be used can be partially changed if the method can be applied to all vectors.

On the other hand, in the motion vector decoding method, the motion vector decoding apparatus, and the motion vector decoding program stored in a computer-readable storage medium in the present invention, the length component and the direction component of the motion vector are decoded based on motion vector information which is encoded using the motion vector encoding method, the motion vector predictive encoding apparatus, and the motion vector predictive encoding program stored in a computer-readable storage medium.

The table for decoding the direction component is selected in accordance with the length component; thus, the direction component is decoded after the length component is decoded.

According to the present invention, it is possible to assign codes in consideration of the distribution of the prediction error vector. As a result, the amount of generated code of the motion vector can be reduced.

MODES FOR CARRYING OUT THE INVENTION

Hereinbelow, embodiments according to the present invention will be explained with reference to the drawings.

(1) Motion Vector Encoding Method

In the present embodiment, an encoding method for performing the motion compensation for each block is assumed, and motion-vector prediction similar to that performed in the above MPEG-1 is performed so as to encode the vector indicating the prediction error (i.e., the prediction error vector). The prediction error vector is calculated in the orthogonal coordinate system. The calculated prediction error vector is converted into length and direction components, and is encoded. The motion vector is a two-dimensional vector.

Figure 2:
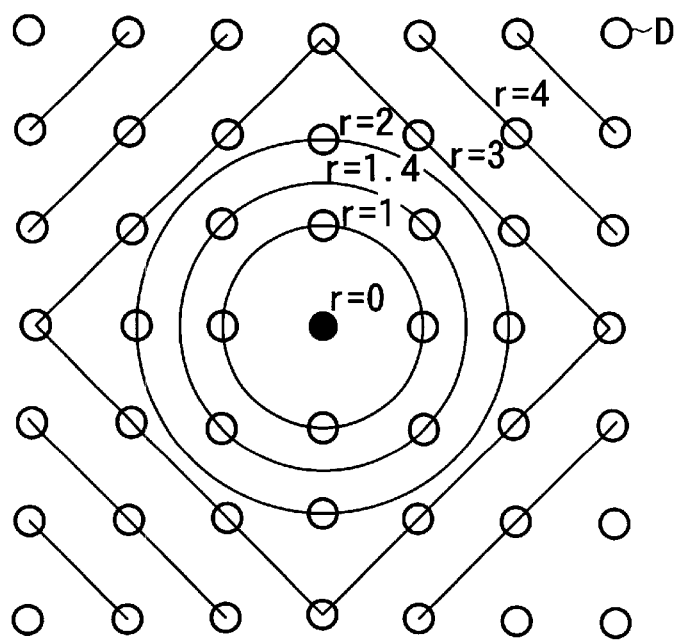
FIG. 2 is a diagram showing the coordinate system used in the embodiment.

The coordinate system used in the present embodiment is shown in FIG. 2. The example in this figure shows the case in which seven dots are arranged in the longitudinal direction and seven dots are also arranged in the cross direction, each dot (D) indicating a position to which a motion vector can be assigned. In FIG. 2, the dot having length component "r=0" is defined as the origin, and circles and lines in FIG. 2 are obtained by connecting dots having the same value of the length component.

In the present embodiment, a plurality of methods for calculating the length component are used, and the following operations are performed for calculating the component.

$$r = \begin{cases} \sqrt{x_d^2 + y_d^2} & \text{if } |x_d| + |y_d| \leq 2 \\ |x_d| + |y_d| & \text{otherwise} \end{cases} \quad (9)$$

where r represents the length component, and $x_d$ and $y_d$ respectively represent horizontal and vertical components of the prediction error vector.

A table for storing codes corresponding to the values of each length component, that is, a length-component encoding table, is used for encoding the length component calculated by the above formula (9). The encoded data is output as length component information to the decoding side. In the above length-component encoding table, the length of code assigned to each length component is short and gradually increased from 0.

In order to encode the direction component, the following operations are performed according to the value of the length component r.

| | |
|---|---|
| r = 0 | not encoded |
| 0 < r ≤ 2 | fixed-length encoding of 2 bits |
| 2 < r | variable-length encoding according to the distance from x axis or y axis, where the shorter the distance, the shorter the length of the code assigned |

Hereinbelow, an example of the encoding operation in the present embodiment will be explained with reference to the flowchart in FIG. 1. In the first step Si, the motion vector of the target block is detected. In the next step S2, the prediction error vector ($x_d$, $y_d$) is calculating using the following equations.

$$x_d = x_i - x_{i-1} \tag{10}$$

$$y_d = y_i - y_{i-1} \tag{11}$$

where $x_i$ and $y_i$ are components of the motion vector of the target block, and $x_{i-1}$ and $y_{i-1}$ are components of the motion vector of the block immediately before the target block.

The operation then shifts to step S3, where length component r of the motion vector is calculated by above formula (9). In the next step S4, the value of the length component r, calculated in the previous step S3, is variable-length-encoded by using the above-described length-component encoding table. The operation then shifts to step S5, where the value of the length component r is checked. Here, if the value of the length component r is 0, then the direction component is not communicated to the decoding side, and the encoding operation is terminated.

If the value of the length component r is not 0, then the operation shifts to step S6, where direction component θ is calculated based on the value of the length component r and the values $x_d$ and $y_d$ of the prediction error vector calculated in step S2. Here, the direction component θ is calculated as a number (an integral value) determined based on the value of the length component r and the values of the horizontal and vertical components $x_d$ and $y_d$ of the prediction error vector.

The above number which indicates the direction component θ is a serial number starting from 0, and a series of serial numbers are assigned to a plurality of motion vectors having the same value of the length component. These numbers for indicating the direction component θ are assigned to each motion vector in the counterclockwise direction, with the prediction error vector of horizontal component $x_d>0$ and vertical component $y_d=0$ as the start point (having number "0"). The following are relationships between the values of the length component r and the numbers of the direction component θ calculated based on the values $x_d$ and $y_d$ of the prediction error vector.

If $0<r\leq2$, then the number for indicating the direction component θ is any one of 0, 1, 2, and 3.

Figure 3:
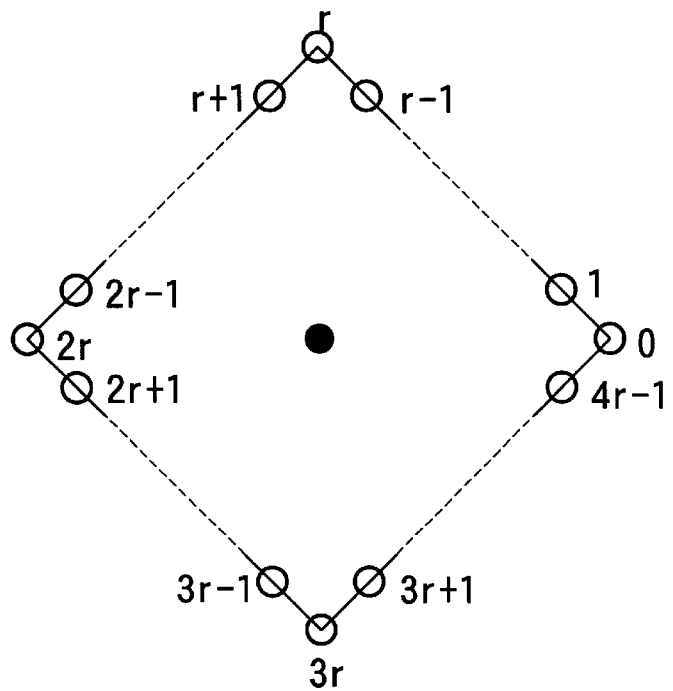
FIG. 3 is a diagram showing the encoded direction component θ.

If $2<r$, then the number for indicating the direction component θ is any one of 0, 1, 2, . . . , 4×r−2, and 4×r−1, as shown in FIG. 3.

Here, the lines in FIG. 3 connecting the dots (indicated by white circles in the figure) are obtained by connecting prediction error vectors having the same value of the length component (i.e., "$|x_d|+|y_d|$" is fixed).

As explained above, the possible range for the number (i.e., integer) indicating the direction component θ depends on the value of the length component r. Therefore, a plurality of conversion tables corresponding to each value of the length component r are previously provided, each table storing the numbers which respectively correspond to the values $x_d$ and $y_d$ of the prediction error vector. From these conversion tables, one table corresponding to the value of the length component (calculated by the above formula (9)) is selected. With reference to the selected table, the number which corresponds to the components $x_d$ and $y_d$ of the prediction error vector is determined.

Figure 4:
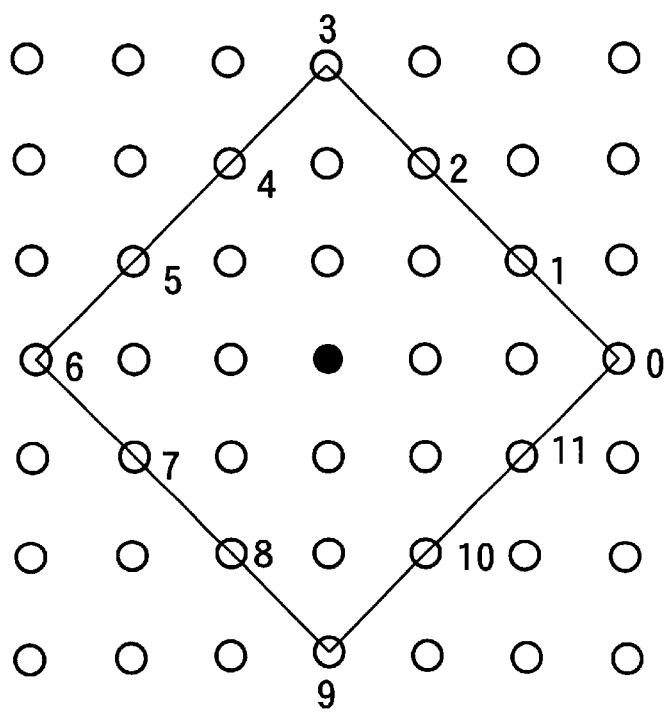
FIG. 4 is a diagram showing the encoded direction component θ (r=3).

As an example, the possible number for the direction component θ in the case of r=3 is shown in FIG. 4. In this case, the direction component θ is indicated using any number selected from 0 to 11 in this figure. In step S6, the conversion table corresponding to the length component r=3 is selected, and any one of numbers 0 to 11 is selected in accordance with the values $x_d$ and $y_d$ of the prediction error vector.

The operation then shifts to step S7, where a direction-component encoding table is used, in which codes corresponding to each number obtained by the above conversion tables are stored. In step S7, a code which is stored in the encoding table and corresponds to the number (calculated in step S6) indicating the direction component θ is extracted and the direction component is encoded. The encoded data is output as direction component information to the decoding side, and the encoding operation is finished. As explained above, the possible range of the integer number of the direction component θ is variable depending on the value of the length component r. Therefore, according to the value of the length component calculated in step S3, one of the encoding tables for storing codes corresponding to each possible number of the direction component θ is selected and referred to. That is, if the length component r is 3, then the encoding table storing codes which respectively correspond to numbers 0 to 11 is selected, while if the length component r is 5, then the encoding table storing codes which respectively correspond to numbers 0 to 19 is selected.

In the above encoding method, the prediction error vector is calculated using the orthogonal coordinate system. The calculated prediction error vector is converted into the length component and the direction component (representing the relevant angle), and these components are encoded. However, the length and direction components of the prediction error vector may be directly calculated based on motion vectors of the target block and the previous block, each motion vector initially indicated using length and direction components. In this case, step 2 (in FIG. 1) for calculating the length component of the prediction error vector is unnecessary, and the conversion tables, which are previously provided corresponding to possible values of the length component r and are used in step S6, store numbers corresponding to the values indicating the angle (that is, the direct direction component) of the prediction error vector.

In the above encoding method, the direction component is encoded using the conversion table and the direction-component encoding table. However, the encoding may be performed using an encoding table in which these two tables are integrated. In this case, a plurality of tables corresponding to each value of the length component r are previously provided, each table directly storing codes of the direction component which respectively correspond to the values $x_d$ and $y_d$ of the prediction error vector. From among these tables, one corresponding to the value of the length component (calculated by the above formula (9)) is selected. With reference to the selected table, the code of the direction component, which corresponds to the components $x_d$ and $y_d$ of the prediction error vector, can be output to the decoding side.

(2) Motion Vector Decoding Method

The operation of the decoding method in the present embodiment will be explained with reference to the flowchart in FIG. 5. In the first step S11, the code of the length component r (i.e., length component information), which was variable-length-encoded at the encoding side, is decoded into the value of the length component r by using a length-component decoding table. In the length-component decoding table, values of the length component r which correspond to each code supplied from the encoding side are stored.

The operation then shifts to step S12, where the value of the length component r is checked. In the checking operation, if the value of the length component r is 0, then values $x_d$ and $y_d$ are set to 0 and the operation shifts to step S15.

If the value of the length component r is not 0 in step S12, then the operation shifts to step S13, where the code of the direction component θ (i.e., direction component information), which was variable-length-encoded at the encoding side, is decoded into the value of the direction component θ by using a direction-component decoding table. Here, one of the direction-component decoding tables is selected according to the value of the length component decoded in step S11, so as to use the decoding table which stores possible numbers for the decoded direction component θ. That is, if the decoded length component r is 3, then the decoding table, from which any one of numbers 0 to 11 can be output according to the code of the direction component θ, is selected. If the decoded length component r is 5, then the decoding table, from which any one of numbers 0 to 19 can be output according to the code of the direction component θ, is selected.

The operation then shifts to step S14, where the horizontal and vertical components of the prediction error vector are calculated based on the length component r and the direction component θ. Here, the length component r and the direction component θ are converted into values suitable for the orthogonal coordinate system, based on the following conversion tables.

Hereinbelowm, the contents of the conversion tables in the cases of the length component r=1, r=1.4, and r=2 are respectively shown in the following Lists 1 to 3. The conversion rules used for the length component r>2 are shown in the following List 4.

| θ | $x_d$ | $y_d$ |
|---|---|---|
| List 1 | | |
| 0 | 1 | 0 |
| 1 | 0 | 1 |
| 2 | −1 | 0 |
| 3 | 0 | −1 |
| List 2 | | |
| 0 | +1 | +1 |
| 1 | +1 | −1 |
| 2 | −1 | +1 |
| 3 | −1 | −1 |
| List 3 | | |
| 0 | 2 | 0 |
| 1 | 0 | 2 |
| 2 | −2 | 0 |
| 3 | 0 | −2 |
| List 4 | | |
| 0 to r − 1 | r − (θmod r) | (θmod r) |
| r to 2r − 1 | −(θmod r) | r − (θmod r) |
| 2r to 3r − 1 | −r + (θmod r) | −(θmod r) |
| 3r to 4r − 1 | (θmod r) | −r + (θmod r) |

In the next step S15, the target vector to be decoded is calculated. As shown in the following equations, the prediction error vector is added to the motion vector of the block which was decoded immediately before, so as to decode the motion vector of the target block.

$$x_i = x_{i-1} + x_d \quad (12)$$

$$y_i = y_{i-1} + y_d \quad (13)$$

where $x_i$ and $y_i$ are components of the motion vector of the target block, and $x_{i-1}$ and $y_{i-1}$ are components of the motion vector of the block which was decoded immediately before the target block.

In the above motion vector decoding method, the number indicating the decoded direction component θ is converted into the horizontal and vertical components of the prediction error vector by using the conversion table, and the motion vector of the target block is output in a format of the orthogonal coordinate system. However, a table for converting the number indicating the decoded direction component θ into a value representing an angle (that is, a direct direction component of the prediction error vector) may be used, and the length and direction components of the motion vector of the target block may be determined based on the length component of the prediction error vector decoded in step Sll, the direction component obtained with reference to the above table, and the length and direction components of the previous block.

In the motion vector decoding method in the above case, the direction- component decoding table and the conversion table are not always necessary for decoding the direction component of the prediction error vector. For example, the direction component of the prediction error vector may be decoded using a decoding table in which the above two tables are integrated. In this case, a plurality of decoding tables corresponding to each value of the length component r are previously provided, and each table stores values indicating angles which correspond to possible variable-length-encoded codes of the direction component θ (encoded at the encoding side). From among these decoding tables, one corresponding to the value of the decoded length component is selected. With reference to the selected table, the code of the direction component θ which was variable-length-encoded at the encoding side can be directly decoded into the value indicating the angle of the prediction error vector (that is, the direction component).

(3) Motion Vector Encoding Apparatus

Figure 1:
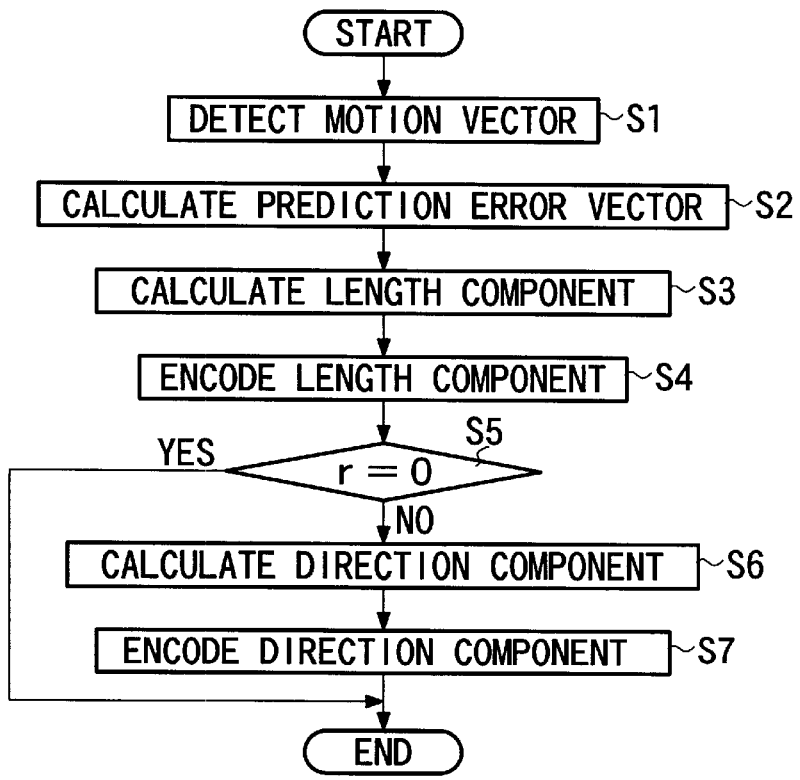
FIG. 1 is a flowchart showing the operations of the motion vector encoding method of an embodiment according to the present invention.
Figure 6:
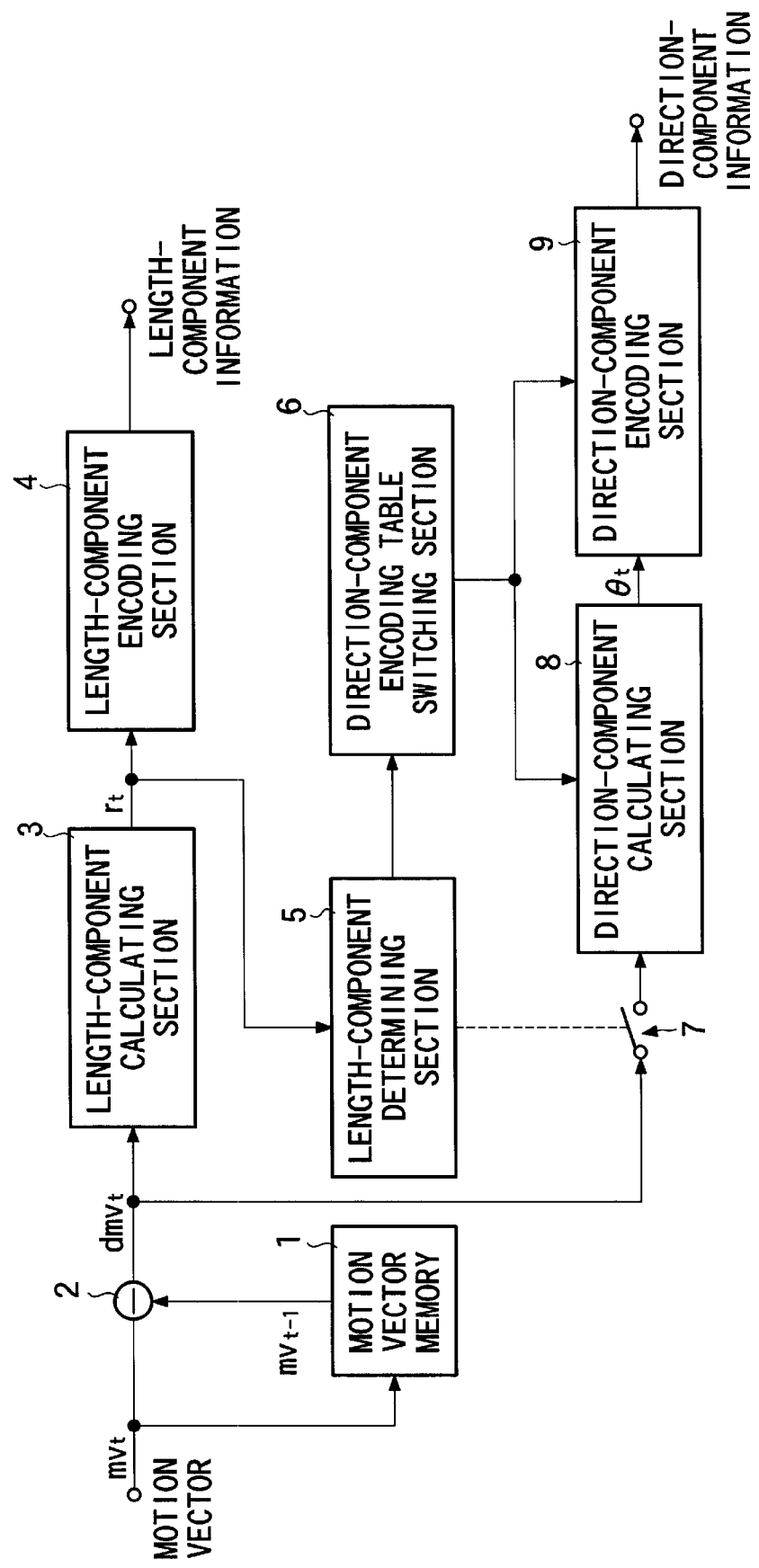
FIG. 6 is a block diagram showing the structure of the motion vector encoding apparatus of an embodiment according to the present invention.

Hereinbelow, the motion vector encoding apparatus for encoding the motion vector according to the motion vector encoding method as shown in the flowchart of FIG. 1 will be explained with reference to FIG. 6. In FIG. 6, motion vector memory 1 stores motion vector mvt of the target block, which is input from an external device. When the next motion vector mvt of the target block is input, the motion vector memory 1 outputs the stored local motion vector as the motion vector $mv_{t-1}$ of the previous block (i.e., the block immediately before the present target block).

Subtracter 2 subtracts the motion vector $mv_{t-1}$ of the previous block, which is output from motion vector memory 1, from the motion vector $mv_t$ of the target block, which is input from an external device, so as to calculate prediction error vector $dmv_t (=(x_d, y_d))$. Length-component calculating section 3 calculates length component $r_t$ of the prediction error vector $dmv_t$ output from the subtracter 2, by using formula (9) explained in the above chapter "(1) motion vector encoding method".

Length-component encoding section 4 stores a length-component encoding table in which codes corresponding to each value of the length component calculated by the length-component calculating section 3 are stored. The value of the length component $r_t$ of the prediction error vector $dmv_t$, calculated by the length-component calculating section 3, is encoded by using the above length-component encoding table, and the encoded result is output as length component information to the decoding side. Here, the lengths of codes stored in the length-component encoding table are short and gradually increase from 0.

Length-component determining section 5 determines whether the value of the length component $r_t$ of the prediction error vector $dmv_t$, calculated by the length-component calculating section 3, is 0. If the value is 0, then the section 5 outputs an "OFF" signal so as to set switch 7 to open. If the value is not 0, then the section 5 outputs the length component $r_t$ calculated by the length-component calculating section 3 to direction-component encoding table switching section 6, and also outputs an "ON" signal so as to set switch 7 to close.

The direction-component encoding table switching section 6 outputs a switching signal for switching the necessary tables according to the value of the length component $r_t$ supplied from the length-component determining section 5. There are two kinds of the switching signal: a signal for switching the conversion table used in direction-component calculating section 8 for calculating the direction component $\theta_t$ of the prediction error vector $dmv_t$, and a table for switching the encoding table used in direction-component encoding section 9 for encoding the direction component $\theta_t$ (explained later in detail). The switch 7 is "on" or "off" according to the ON/OFF signal output from the length-component determining section 5.

The direction-component calculating section 8 stores a plurality of conversion tables corresponding to the values of the length component $r_t$, each table storing numbers (i.e., integral values) indicating each direction component $\theta_t$ of the prediction error vector $dmv_t$ (output from subtracter 2) in correspondence to the horizontal and vertical components of the prediction error vector $dmv_t$. In accordance with the switching signal output from the direction-component encoding table switching section 6, the direction-component calculating section 8 selects one of the conversion tables suitable for the value of the length component $r_t$ calculated by the length-component calculating section 3. The section 8 then converts the horizontal and vertical components of the prediction error vector $dmv_t$ (output from the subtracter 2) into a number indicating the direction component $\theta_t$, by using the selected conversion table.

The conversion tables stored in the direction-component calculating section 8 are similar to the conversion tables explained in the above chapter "(1) motion vector encoding method", and detailed explanations are omitted here so as to avoid repeated explanations.

The direction-component encoding section 9 stores a plurality of encoding tables corresponding each value of the length component $r_t$, each encoding table storing codes corresponding to possible numbers for the direction component $\theta_t$ output from the direction-component calculating section 8. For example, the direction-component encoding table used in the case of $r_t=3$ stores codes which respectively correspond to the numbers 0 to 11, while the direction-component encoding table used in the case of r=5 stores codes which respectively correspond to the numbers 0 to 19.

The direction-component encoding section 9 selects one of the direction-component encoding tables which corresponds to the value of the length component $r_t$ calculated by the length-component calculating section 3, in accordance with the switching signal output from the direction-component encoding table switching section 6. The encoding section 9 then encodes the number indicating the direction component $\theta_t$ output from the direction-component calculating section 8 by using the selected direction-component encoding table, and outputs the encoded result as direction component information to the decoding side.

Operations of the above motion vector encoding apparatus will be explained below. First, when motion vector $mv_t$ of the target block is input from an external device, the input vector is supplied to the motion vector memory 1 and the subtracter 2. In addition, motion vector $mv_{t-1}$ of the previous block is output from the motion vector memory 1 o the subtracter 2. Accordingly, in the subtracter 2, the motion vector $mv_{t-1}$ of the previous block is subtracted from the motion vector $mv_t$ of the target block so that prediction error vector $dmv_t$ is calculated (this process corresponds to step S2 in FIG. 1).

The prediction error vector $dmv_t$ calculated by subtracter 2 is then output to the length-component calculating section 3 and switch 7. In the length-component calculating section 3, the value of the length component $r_t$ of the input prediction error vector $dmv_t$ is calculated using formula (9) explained in the above chapter "(1) motion vector encoding method" (this process corresponds to step S3 in FIG. 1). The calculated result is output to the length-component encoding section 4 and the length-component determining section 5. The length component $r_t$ output to the length-component encoding section 4 is variable-length-encoded using the length-component encoding table, and the encoded result is output as length component information to the decoding side (this process corresponds to step S4 in FIG. 1).

The length-component determining section 5 determines whether the value of the input length component $r_t$ is 0 (this process corresponds to step S5 in FIG. 1). If the value of the input length component $r_t$ is 0, then the OFF signal is output from the length-component determining section 5. Accordingly, switch 7 is opened; thus, the prediction error vector $dmv_t$ is not input into the direction-component calculating section 8. Therefore, in the direction-component encoding section 9, the direction component $\theta_t$ of the motion vector of the target block is not encoded (this process corresponds to the case "YES" in determination step S5 in FIG. 1).

If the value of the length component $r_t$ is not 0 (this process corresponds to the case "NO" in determination step S5 in FIG. 1), then the ON signal is output from the length-component determining section 5 and switch 7 is closed. In addition, the value of the length component $r_t$ calculated by the length-component calculating section 3 is output to the direction-component encoding table switching section 6. Accordingly, switching signals for selecting the conversion table and encoding table suitable for the value of the input length component $r_t$ are output from the direction-component encoding table switching section 6 to the direction-component calculating section 8 and the direction-component encoding section 9.

In the direction-component calculating section 8, one of the conversion tables, which corresponds to the value of the input length component $r_t$, is selected according to the input switching signal, and the direction component $\theta_t$ of the prediction error vector $dmv_t$ is calculated by using the selected conversion table. That is, the number (i.e., integral value) indicating the direction component $\theta_t$ is output (this process corresponds to step S6 in FIG. 1). In the direction-component encoding section 9, one of the direction-component encoding tables, which corresponds to the value of the input length component $r_t$, is selected according to the input switching signal, and the number indicating the direction component $\theta_t$, output from the direction-component calculating section 8, is encoded by using the selected direction-component encoding table (this process corresponds to step S7 in FIG. 1), and the encoded result is output as direction component information to the decoding side.

In the above-explained motion vector encoding apparatus, the input values of the motion vector of the target block are based on the orthogonal coordinate system, and the prediction error vector is calculated by subtracter 2 in the orthogonal coordinate system. However, the length component and the direction component (i.e., the value representing the angle) of the motion vector of the target block may be used as input values, and the length component $r_t$ and the direction component $\theta_t$ of the prediction error vector $dmv_t$ may be calculated in subtracter 2 and be respectively output.

In this case, the motion vector memory 1 stores the length component and the direction component of the motion vector of the previous block. Additionally, length-component calculating section 3 is unnecessary in this case, and the length component $r_t$ of the target block is directly supplied from the subtracter 2 to the length-component iencoding section 4 and the length-component determining section 5. In addition, each conversion table stored in the direction-component calculating section 8 stores the number corresponding to each value indicating the angle of the prediction error vector (that is, a direct direction component).

In the above motion vector encoding apparatus, instead of the direction-component calculating section 8 and the direction-component encoding section 9, a single structural element (provisionally called "direction-component encoding means") may be provided, which stores a plurality of tables (provisionally called "integrated encoding tables") corresponding to each value of the length component $r_t$. Here, each table has an integrated form of the conversion table stored in the direction-component calculating section 8 and the direction-component encoding table stored in the direction-component encoding section 9.

In this case, each integrated encoding table stores codes of the direction component corresponding to the values of the horizontal and vertical components $x_d$ and $y_d$ of the prediction error vector. The above direction-component encoding means selects one of the integrated encoding tables in accordance with the value of the length component $r_t$, based on the switching signal output from the direction-component encoding table switching section 6, and directly determines the code (indicating the direction component) corresponding to the horizontal and vertical components $x_d$ and $y_d$ of the prediction error vector based on the selected integrated encoding table and outputs the determined code as direction component information to the decoding side.

(4) Motion Vector Decoding Apparatus

Figure 7:
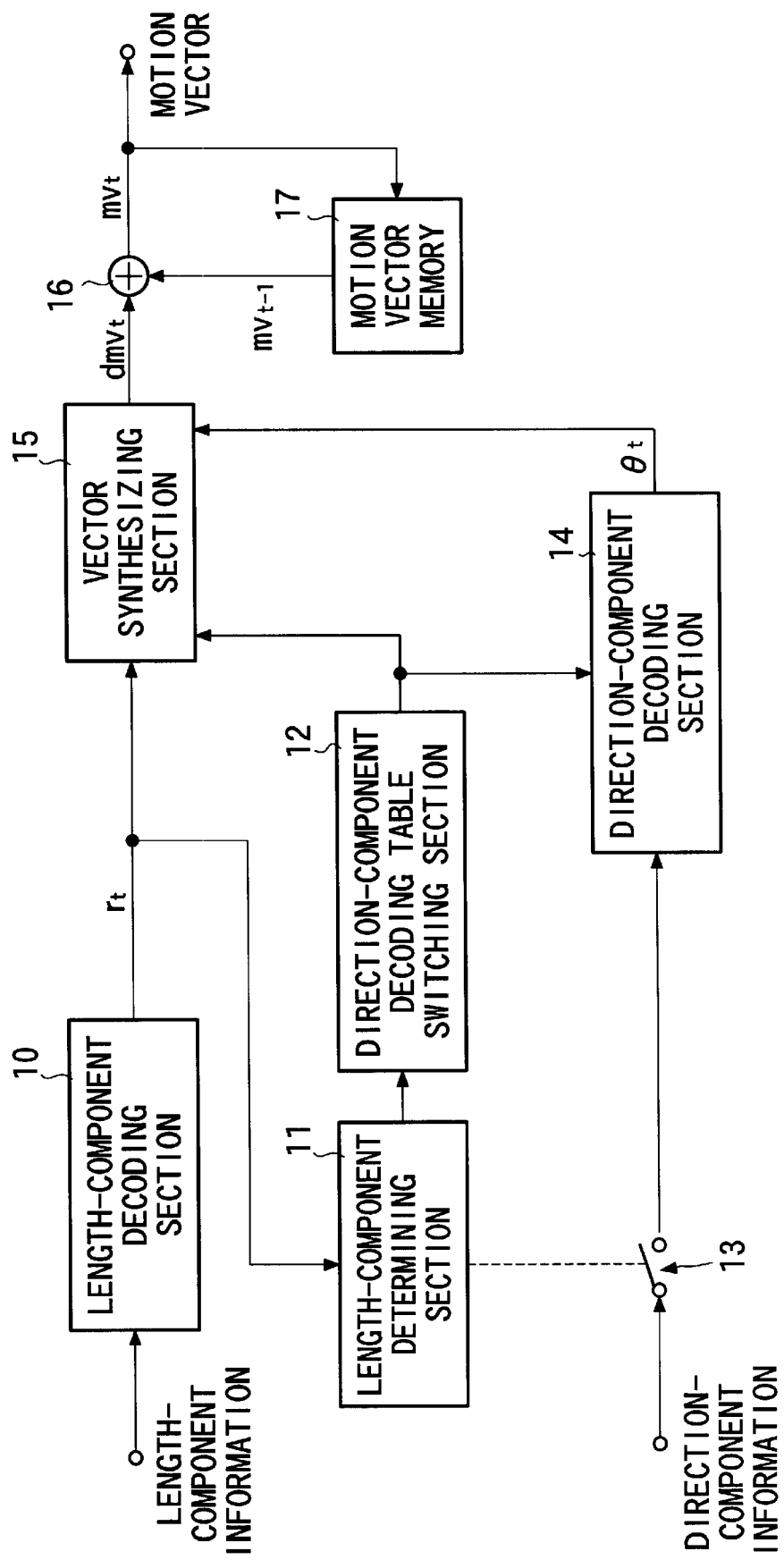
FIG. 7 is a block diagram showing the structure of the motion vector decoding apparatus of an embodiment according to the present invention.
Figure 9:
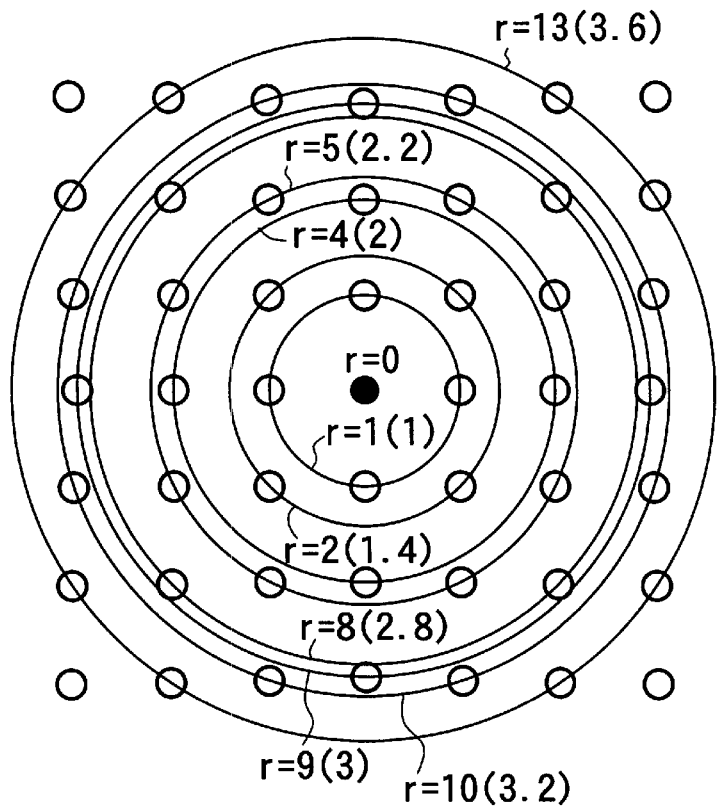
FIG. 9 is a diagram for explaining an example method of calculating the length component in the case of using the sum of squares with respect to horizontal and vertical components in an orthogonal coordinate system.
Figure 10:
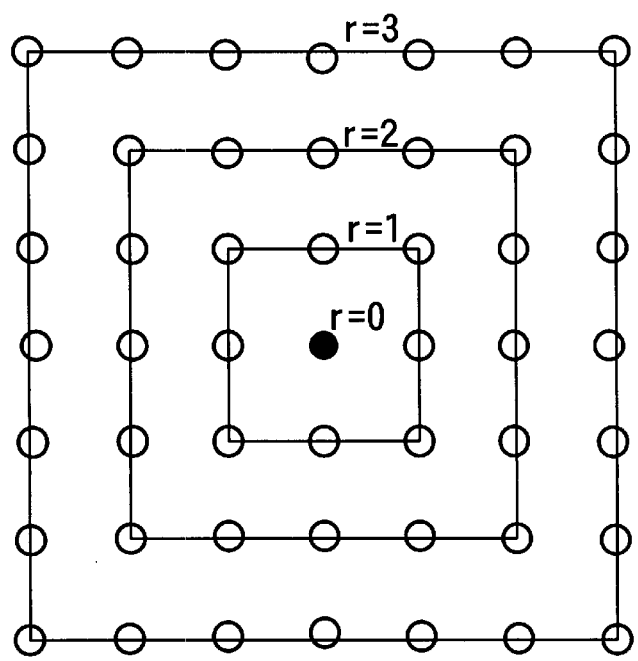
FIG. 10 is a diagram for explaining an example method of calculating the length component in the case of using the maximum value with respect to horizontal and vertical components in an orthogonal coordinate system.
Figure 11:
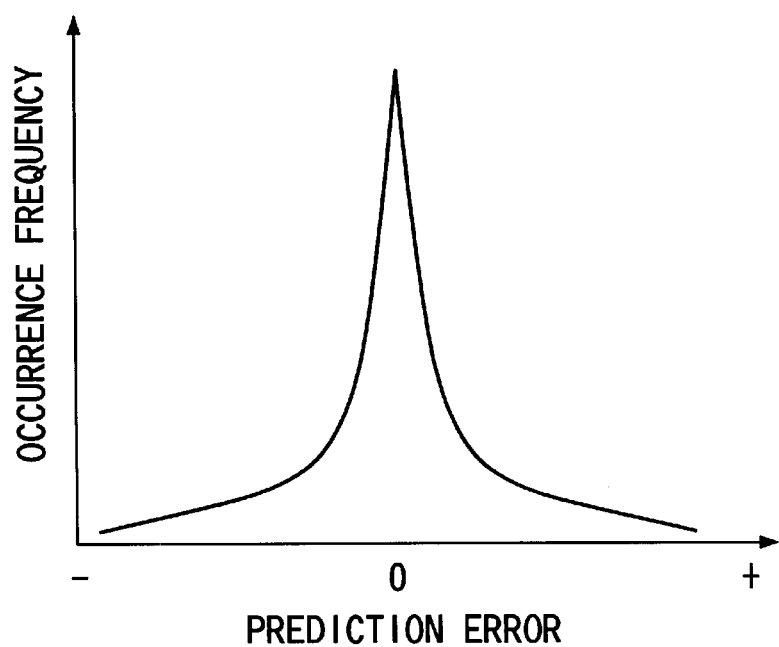
FIG. 11 is a diagram showing distributions of the prediction error with respect to general motion pictures.
Figure 12:
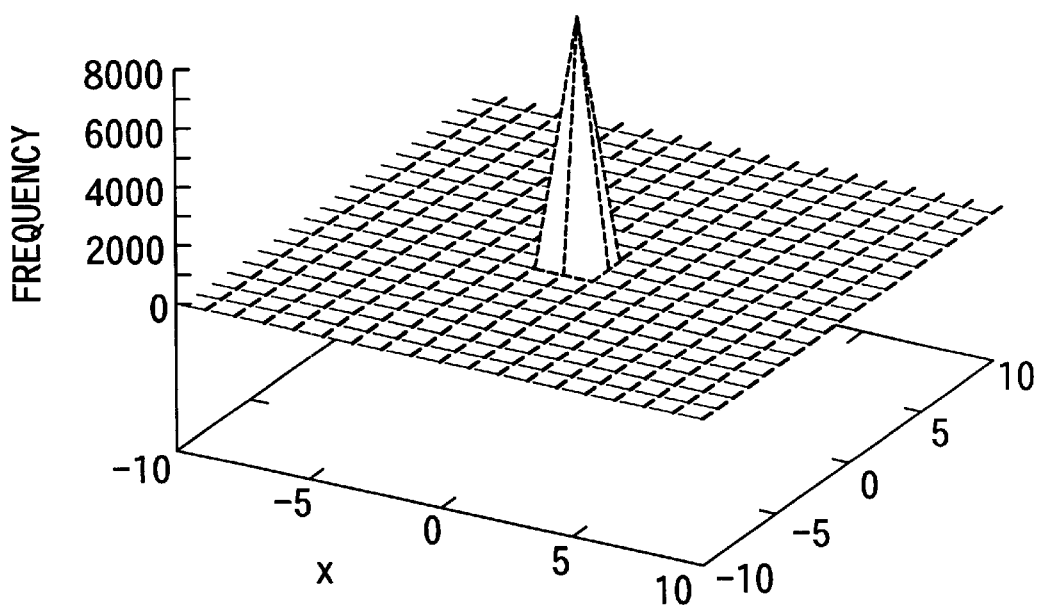
FIG. 12 is a diagram showing distributions of the difference motion vector with respect to general motion pictures.
Figure 13:
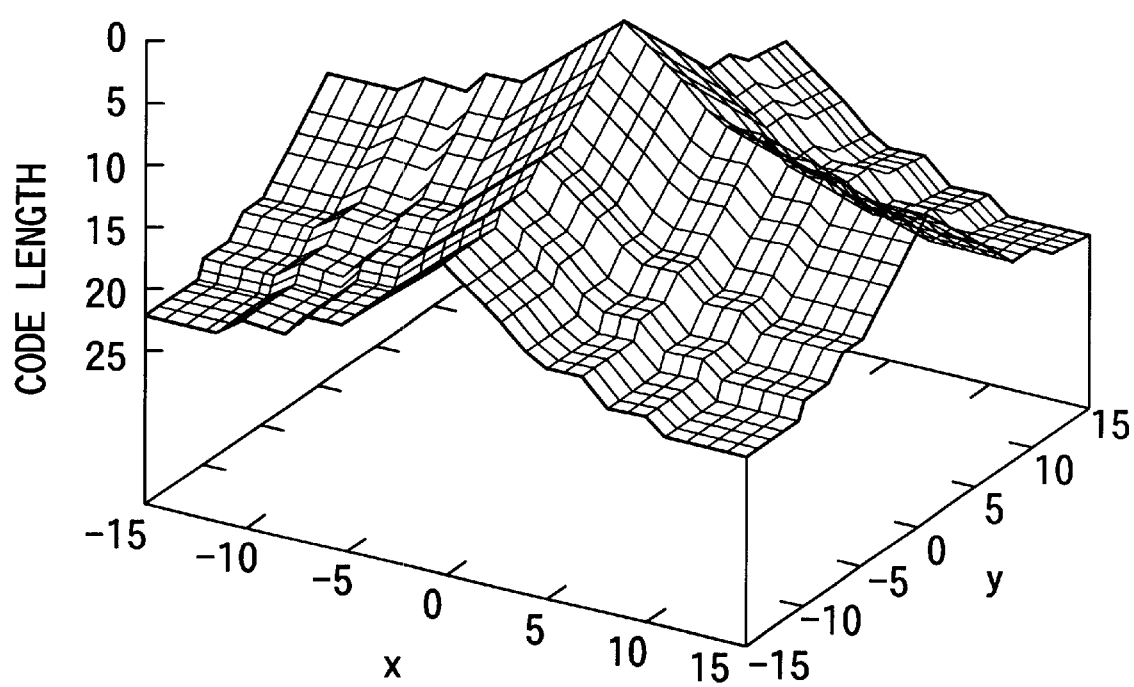
FIG. 13 is a diagram showing example code lengths assigned to the motion vector in the conventional method.

Hereinbelow, the decoding apparatus for decoding the motion vector according to the motion vector decoding method as shown in the flowchart in FIG. 5 will be explained with reference to FIG. 7. In FIG. 7, length-component decoding section 10 decodes the length component information supplied from the encoding side, and outputs the length component $r_t$ of the prediction error vector $dmv_t$.

Length-component determining section 11 determines whether the value of the length component $r_t$ of the prediction error vector $dmv_t$, decoded by the length-component decoding section 10, is 0. If the value of the length component $r_t$ is 0, the determining section 11 outputs an "OFF" signal for opening switch 13. If the value of the length component $r_t$ is not 0, the determining section 11 outputs the length component $r_t$, decoded by the length-component decoding section 10, to direction-component table switching section 12, and also outputs an "ON" signal for closing switch 13.

The direction-component table switching section 12 outputs switching signals for switching the necessary tables according to the value of the length component $r_t$ supplied from the length-component determining section 11. There are two kinds of the switching signal: a signal for switching the conversion table used in direction-component decoding section 14 for decoding the number indicating the direction component $\theta_t$ based on the input direction component information, and a table for switching the conversion table used in vector synthesizing section 15 for obtaining the horizontal and vertical components $x_d$ and $y_d$ of the prediction error vector $dmv_t$ based on the direction component $\theta_t$ of the prediction error vector (explained later in detail). The switch 13 is "on" or "off" according to the ON/OFF signal output from the length-component determining section 11.

The direction-component decoding section 14 stores a plurality of direction-component decoding tables corresponding to the values of the length component $r_t$, each table storing numbers (i.e., integral values: output from the direction-component calculating section 8 in FIG. 6) indicating each direction component $\theta_t$ in accordance with the direction component information supplied from the encoding side. In accordance with the switching signal output from the direction-component decoding table switching section 12, the direction-component decoding section 14 selects one of the direction-component decoding tables suitable for the value of the length component $r_t$ of the prediction error vector, decoded by the length-component decoding section 10.

That is, if the decoded length component $r_t$ is 3, then the direction-component decoding table, from which any one of numbers 0 to 11 can be output according to the direction component information, is selected. If the decoded length component $r_t$ is 5, then the direction-component decoding table, from which any one of numbers 0 to 19 can be output according to the direction component information, is selected.

The direction-component decoding section 14 decodes the direction component information into a number indicating the direction component $\theta_t$ of the prediction error vector $dmv_t$ based on the selected direction-component decoding table, and outputs the number to the vector synthesizing section 15.

The vector synthesizing section 15 stores a plurality of conversion tables corresponding to each value of the length component $r_t$, each table used for converting the number indicating the direction component $\theta_t$ (output from the direction-component decoding section 14) into the horizontal and vertical components $x_d$ and $y_d$ of the prediction error vector $dmv_t$ (refer to Lists 1 to 4 shown in the above chapter (2): motion vector decoding method). In accordance with the switching signal output from the direction-component table switching section 12, the vector synthesizing section 15 selects one of the conversion tables suitable for the value of the length component $r_t$ of the prediction error vector $dmv_t$, decoded by the length-component decoding section 10. The vector synthesizing section 15 also determines the horizontal and vertical components $x_d$ and $y_d$ of the prediction error vector $dmv_t$ based on the selected conversion table and the direction component $\theta_t$ output from the direction-component decoding section 14.

Adder 16 respectively adds the horizontal and vertical components $x_d$ and $y_d$ of the prediction error vector $dmv_t$, obtained by the vector synthesizing section 15, to the horizontal and vertical components $x_{t-1}$ and $y_{t-1}$ of the motion vector $mv_{t-1}$, which were decoded immediately before and are output from motion vector memory 17. The adder 16 outputs the added result as motion vector $mv_t$ of the target block to the outside and the motion vector memory 17.

The motion vector memory 17 stores the motion vector $mv_t$ of the target block, output from the adder 16, and outputs the stored vector to the adder 16 as the motion vector $mv_{t-1}$ which was decoded immediately before, when the next prediction error vector $dmv_t$ is output from the vector synthesizing section 15.

The operations of the above-explained motion vector decoding apparatus will be explained below. When the length component information and the direction component information of the predicted vector are supplied from the encoding side, the length component information is decoded in the length-component decoding section 10 so that the value of the length component $r_t$ is output to the length component determining section 11 and the vector synthesizing section 15 (this process corresponds to step S11 in FIG. 5).

Figure 5:
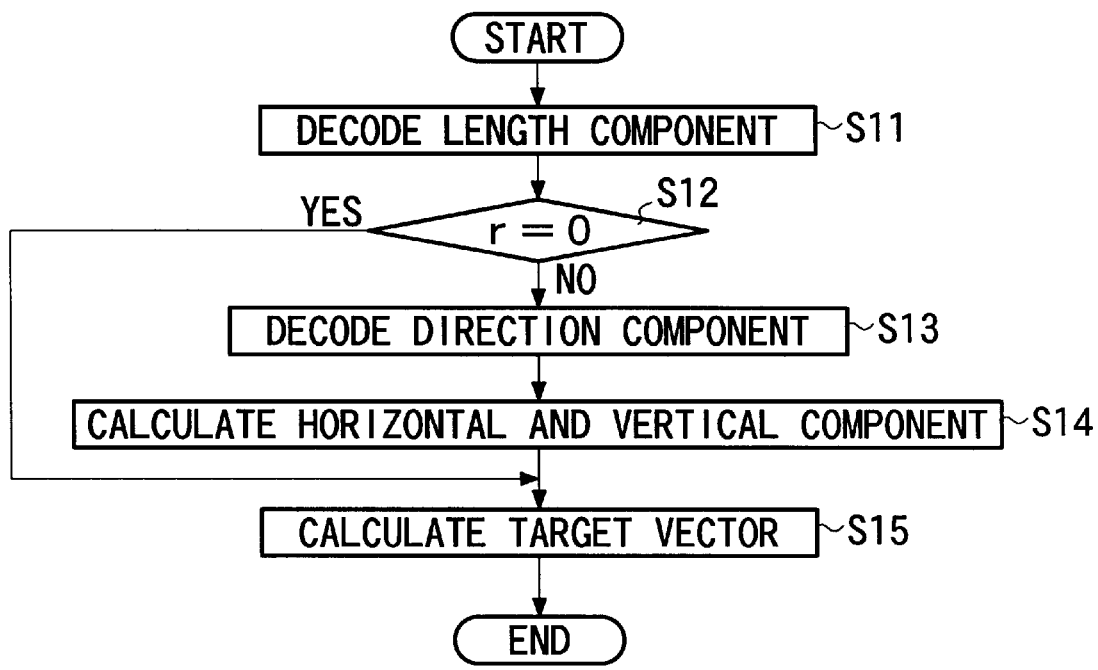
FIG. 5 is a flowchart showing the operations of the motion vector decoding method of an embodiment according to the present invention.
Figure 8:
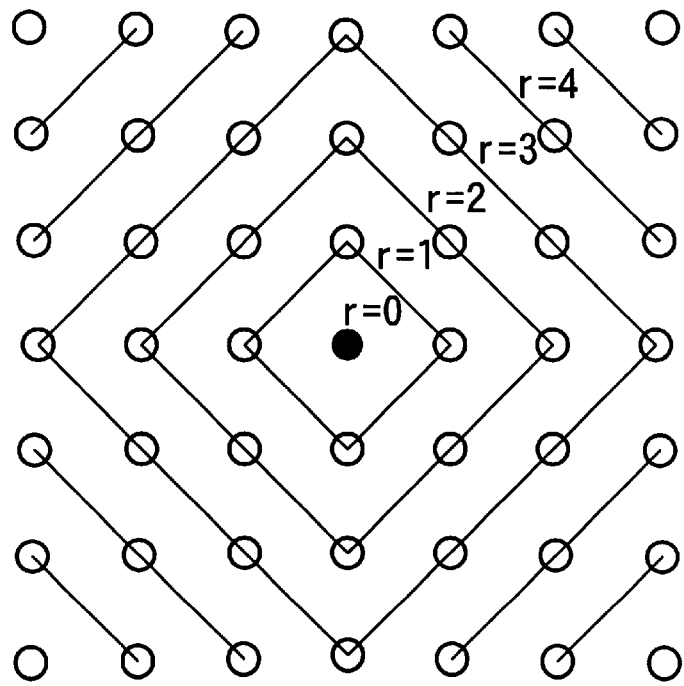
FIG. 8 is a diagram for explaining an example method of calculating the length component in the case of using the sum of absolute values with respect to horizontal and vertical components in an orthogonal coordinate system.

In the length-component determining section 11, it is determined whether the value of the decoded length component $r_t$ is 0 (this process corresponds to step S12 in FIG. 5). If the value of the decoded length component $r_t$ is 0, then the OFF signal is output from the length component determining section 11. Accordingly, the switch 13 is opened and the direction component information supplied from the encoding side is not output to the direction component decoding section 14. As the value of $r_t$ is 0, the vector synthesizing section 15 outputs value "0" as the prediction error vector $dmv_t$ (that is, both horizontal and vertical components $x_d$ and $y_d$ are 0) to adder 16 (this process corresponds to the case "YES" in step S12 in FIG. 5).

Accordingly, motion vector $mv_{t-1}$, which was decoded immediately before and is output from the motion vector memory 17, is output from adder 16, as the motion vector $mv_t$ of the target block to be decoded, to the motion vector memory 17 and to the outside (this process corresponds to step S15 in FIG. 5).

If the value of the length component $r_t$ is not 0 (this determination corresponds to the case "NO" in step S12 in FIG. 5), then the value of the decoded length component $r_t$ is output from the length-component determining section 11 to the direction-component decoding table switching section 12. Accordingly, the switching signals for selecting the direction-component decoding table and the conversion table corresponding to the decoded length component $r_t$ are output from the direction-component decoding table switching section 12 to the direction-component decoding section 14 and the vector synthesizing section 15.

In addition, the ON signal is output from the length-component determining section 11 so that switch 3 is closed. Accordingly, in the direction-component decoding section 14, one of the direction-component decoding tables which corresponds to the value of length component $r_t$ is selected according to the switching signal supplied from the direction-component decoding table switching section 12. Using the selected direction-component decoding table, the direction component information supplied from the encoding side is decoded into a number indicating the direction component $\theta_t$ of the prediction error vector $dmv_t$ (this process corresponds to step S13 in FIG. 5), and the decoded result is output to the vector synthesizing section 15.

In the vector synthesizing section 15, one of the conversion tables which corresponds to the value of the length component $r_t$ is selected according to the switching signal supplied from the direction-component decoding table switching section 12, and with reference to the selected conversion table, the horizontal and vertical components $x_d$ and $y_d$ of the prediction error vector $dmv_t$ are determined based on the number indicating the direction component $\theta_t$ output from the direction-component decoding section 14 (this process corresponds to step S14 in FIG. 5).

In the adder 16, the horizontal and vertical components $x_d$ and $y_d$ of the prediction error vector $dmv_t$, determined in the vector synthesizing section 15, and the horizontal and vertical components $x_{t-1}$ and $y_{t-1}$ of the motion vector $mv_{t-1}$, decoded immediately before and output from the motion vector memory 17, are respectively added, and the added results are output to the motion vector memory 17 and to the outside as the motion vector $mv_t$ of the target block (this process corresponds to step S15 in FIG. 5).

In the above-explained motion vector decoding apparatus, with reference to the conversion table stored in the vector synthesizing section 15, the number indicating the decoded direction component $\theta_t$ is converted into the horizontal and vertical components $x_d$ and $y_d$ of the prediction error vector $dmv$, and the motion vector of the target block is output from the adder 16 in the orthogonal coordinate system. However, the length and direction components of the motion vector of the target block may be calculated and determined in the adder 16 and be output as decoded results.

In this case, the motion vector memory 17 stores length and direction components of the motion vector of the previous block, and each conversion table (corresponding to each value of the length component $r_t$) stored in the vector synthesizing section 15 stores an angle value (that is, direct direction component $\theta_t$) corresponding to the number which indicates the relevant direction component $\theta_t$. In addition, the length component $r_t$ decoded by the length-component decoding section 10 is supplied, not only to the length-component determining section 11 and the vector synthesizing section 15, but also to the adder 16.

Also in the above motion vector decoding apparatus, instead of the direction component decoding section 14 and the vector synthesizing section 15, a single structural element (provisionally called "direction-component decoding means") may be provided, which stores a plurality of tables (provisionally called "integrated decoding tables") corresponding to each value of the length component $r_t$, each table having an integrated form of the direction-component decoding table stored in the direction-component decoding section 14 and the conversion table stored in the vector synthesizing section 15. In this case, the direction component of the prediction error vector can be directly determined based on the direction component information by using the integrated decoding table selected according to the value of the length component $r_t$.

In this case, each integrated decoding table stores the direction component (that is, the value indicating an angle) of the prediction error motion vector in accordance with direction component information (i.e., the code corresponding to the direction component of the prediction error vector), and the direction-component decoding means selects one of the integrated decoding tables, which corresponds to the decoded length component $r_t$, according to the switching signal output from the direction-component table switching section 12. With reference to the selected table, the direction component of the prediction error vector is directly output based on the input direction component information.

In the above-explained embodiment, programs for executing the following operations may be stored in a computer-readable storage medium such as a CD-ROM or a floppy disk, and each program stored in the storage medium may be loaded and executed by a computer so as to perform the motion vector encoding: the motion-vector encoding operation as shown in the flowchart of FIG. 1, and operations of motion vector memory 1, subtracter 2, length-component calculating section 3, length-component encoding section 4, length-component determining section sections 5, direction-component encoding table switching section 6, switch 7, direction-component calculating section 8, and direction-component encoding section 9 as shown in the block diagram of FIG. 6.

Similarly, in order to perform the motion vector decoding, programs for executing the following operations may be stored in a computer-readable storage medium, and each program stored in the storage medium may be loaded and executed by a computer: the motion-vector decoding operation as shown in the flowchart of FIG. 5, and operations of length-component decoding section 10, length-component determining section 11, direction-component decoding table switching section 12, switch 13, direction-component decoding section 14, vector synthesizing section 15, adder 16, and motion vector memory 17 as shown in the block diagram of FIG. 7.

The present invention is not limited to the above-described embodiments, but various variations and applications are possible in the scope of the claimed invention.

What is claimed is:

1. A motion vector encoding method used in a motion-picture encoding method which uses motion-compensating interframe prediction, the motion vector encoding method comprising:
    a first step of calculating a length component of a motion vector;
    a second step of encoding the calculated length component and outputting the encoded result as length component information;
    a third step of calculating a direction component of the motion vector; and
    a fourth step of encoding the calculated direction component and outputting the encoded result as direction component information.

2. A motion vector encoding method as claimed in claim 1, wherein the process in the third step is executed after the process of the second step is performed.

3. A motion vector encoding method as claimed in claim 1, further comprising:
    a fifth step, executed after the second step, for determining the value of the calculated length component, and
    wherein if the value of the length component, determined in the fifth step, is not 0, then the operation shifts to the third step, while if the value is 0, then the encoding operation is finished.

4. A motion vector encoding method as claimed in claim 1, wherein in the fourth step:
    one of a plurality of encoding tables is selected, the selected table corresponding to the value of the length component calculated in the first step, wherein each encoding table stores codes corresponding to each calculated direction component of the motion vector, and the number of possible values for the direction component of the motion vector depends on the value of the length component of the motion vector, and
    the direction component of the motion vector, calculated in the third step, is encoded with reference to the selected encoding table.

5. A motion vector encoding method as claimed in claim 1, wherein in the first step:
    the length component of the motion vector is calculated using a calculating method selected from the group consisting of the sum of absolute values, the sum of squares, the square root of the sum of squares, and the maximum value with respect to horizontal and vertical components of the motion vector in an orthogonal coordinate tesystem.

6. A motion vector encoding method as claimed in claim 1, wherein in the first step:
    the length component of the motion vector is calculated using a plurality of calculating methods selected from the g roup consistin g of the sum of absolute values, the sum of squares, the square root of the sum of squares, and the maximum value with respect to horizontal and vertical component s of the motion vector in an orthogonal coordinate system, and
    the selected calculating methods are switched according to the values of the horizontal and vertical components.

7. A motion vector encoding method as claimed in claim 1, wherein:
    the motion vector is represented by values of horizontal and vertical components in an orthogonal coordinate system;
    in the first step, the length component of the motion vector is calculated based on the values of the horizontal and vertical components in the orthogonal coordinate system; and
    in the third step, the direction component of the motion vector is calculated based on the values of the horizontal and vertical components in the orthogonal coordinate system.

8. A motion vector encoding method as claimed in claim 1, wherein:
    in the third step, one of a group of numbers which are previously assigned to a plurality of motion vectors having the same value of length component is selected, the selected number corresponding to the direction component of the motion vector and being determined as the direction component of the motion vector; and
    in the fourth step, the number, determined as the direction component of the motion vector in the third step, is encoded.

9. A motion vector decoding method for decoding a motion vector which was encoded by the motion vector encoding method as claimed in claim 1, the decoding method comprising:
    a sixth step of decoding the length component of the motion vector based on the length component information obtained by the motion vector encoding method;
    a seventh step of decoding the direction component of the motion vector based on the direction component information obtained by the motion vector encoding method; and
    an eighth step of synthesizing the motion vector using the length and direction components decoded in the sixth and seventh steps.

10. A motion vector decoding method as claimed in claim 9, wherein the process in the seventh step is executed after the process of the sixth step is performed.

11. A motion vector decoding method as claimed in claim 9, further comprising:
    a ninth step, executed after the sixth step, for determining the value of the decoded length component, and
    wherein if the value of the length component, determined in the ninth step, is not 0, then the operation shifts to the seventh step, while if the value is 0, then the value of the direction component is set to 0 and the operation jumps to the eighth step.

12. A motion vector decoding method as claimed in claim 10, wherein in the seventh step:
    one of a plurality of decoding tables is selected, the selected table corresponding to the value of the length component decoded in the sixth step, wherein each decoding table stores values of the direction component corresponding to the code of the decoded direction component, and the number of possible values for the decoded direction component of the motion vector depends on the value of the decoded length component of the motion vector, and the encoded direction component of the motion vector is decoded with reference to the selected decoding table.

13. A motion vector decoding method as claimed in claim 9, wherein in the eighth step, the length and direction components decoded in the sixth and seventh steps are converted into horizontal and vertical components in an orthogonal coordinate system.

14. A motion vector decoding method as claimed in claim 9, wherein in the seventh step, the direction component of the motion vector is calculated according to the direction component information, based on numbers which are previously assigned to a plurality of motion vectors having the same value of the length component.

15. A motion vector encoding method used in a motion-picture encoding method which uses motion-compensating interframe prediction, the motion vector encoding method comprising the steps of:

calculating a length component of a motion vector when the motion vector is encoded;

encoding the calculated length component;

determining the value of the calculated length component;

calculating a direction component of the motion vector;

selectively determining the contents of an encoding table for encoding the direction component of the motion vector, in accordance with the determined value of the length component; and encoding the calculated direction component based on the selected encoding table.

16. A motion vector decoding method for decoding the motion vector information encoded by the motion vector encoding method as claimed in claim 15, the decoding method comprising the steps of:

decoding the length component of the motion vector;

determining the value of the length component of the motion vector;

selectively determining the contents of a decoding table for decoding the direction component in accordance with the determined value of the length component;

decoding the direction component of the motion vector based on the selected decoding table; and synthesizing the motion vector based on the decoded length and direction components.

17. A motion vector encoding apparatus used for a motion-picture encoding method which uses motion-compensating interframe prediction, the motion vector encoding apparatus comprising:

length-component calculating means for calculating a length component of a motion vector;

length-component encoding means for encoding the calculated length component and outputting the encoded result as length component information;

direction-component calculating means for calculating a direction component of the motion vector; and direction-component encoding means for encoding the calculated direction component and outputting the encoded result as direction component information.

18. A motion vector encoding apparatus as claimed in claim 17, wherein the direction-component encoding means encodes the direction component after the length-component en coding means encodes the length component of the motion vector.

19. A motion vector encoding apparatus as claimed in claim 17, further comprising:

length-component determining means for determining the value of the length component calculated by the length-component calculating means; and encoding operation terminating means for terminating the encoding of the length component of the motion vector if it is determined by the length-component determining means that the value of the length component is 0.

20. A motion vector encoding apparatus as claimed in claim 17, further comprising:

switching signal output means for outputting a switching signal in accordance with the length component of the motion vector, and wherein the direction-component encoding means previously stores a plurality of encoding tables, wherein each encoding table stores codes corresponding to each calculated direction component of the motion vector, and the number of possible values for the direction component of the motion vector depends on the value of the length component of the motion vector; and the direction-component encoding means selects one of the encoding tables which corresponds to the length component of the motion vector in accordance with the switching signal output from the switching signal output means, and encodes the direction component of the motion vector based on the selected encoding table.

21. A motion vector encoding apparatus as claimed in claim 17, wherein the length-component calculating means calculates the length component of the motion vector by using a calculating method selected from the group consisting of the sum of absolute values, the sum of squares, the square root of the sum of squares, and the maximum value with respect to horizontal and vertical components of the motion vector in an orthogonal coordinate system.

22. A motion vector encoding apparatus as claimed in claim 17, wherein the length-component calculating means:

calculates the length component of the motion vector by using a plurality of calculating methods selected from the group consisting of the sum of absolute values, the sum of squares, the square root of the sum of squares, and the maximum value with respect to horizontal and vertical components of the motion vector in an orthogonal coordinate system; and switches the selected calculating methods according to the values of the horizontal and vertical components.

23. A motion vector encoding apparatus as claimed in claim 17, wherein:

the motion vector is represented by values of horizontal and vertical components in an orthogonal coordinate system;

the length-component calculating means calculates the length component of the motion vector based on the values of the horizontal and vertical components in the orthogonal coordinate system; and the direction-component calculating means calculates the direction component of the motion vector based on the values of the horizontal and vertical components in the orthogonal coordinate system.

24. A motion vector encoding apparatus as claimed in claim 17, wherein:

the direction-component calculating means selects one of a group of numbers which are previously assigned to a plurality of motion vectors having the same value of the length component, the selected number corresponding to the direction of the motion vector and being determined as the direction component of the motion vector; and the direction-component encoding means encodes the number which was determined by the direction-component calculating means as the direction component of the motion vector.

25. A motion vector decoding apparatus for decoding a motion vector which was encoded by the motion vector encoding apparatus as claimed in claim 17, the decoding apparatus comprising:

length-component decoding means for decoding the length component of the motion vector based on the length component information output from the length-component encoding means;

direction-component decoding means for decoding the direction component of the motion vector based on the direction component information output from the direction-component encoding means; and vector synthesizing means for synthesizing the motion vector using the decoded length and direction components.

26. A motion vector decoding apparatus as claimed in claim 25, wherein the direction-component decoding means decodes the direction component of the motion vector after the length-component decoding means decodes the length component of the motion vector.

27. A motion vector decoding apparatus as claimed in claim 25, further comprising:

length-component determining means for determining the value of the length component decoded by the length-component decoding means, and decoding operation terminating means for terminating the decoding of the direction component performed by the direction-component decoding means if it is determined by the length-component determining means that the length component of the motion vector is 0.

28. A motion vector decoding apparatus as claimed in claim 26, further comprising:

switching signal output means for outputting a switching signal in accordance with the decoded length component of the motion vector, and wherein the direction-component decoding means previously stores a plurality of decoding tables, wherein each decoding table stores values of the direction component corresponding to the code of the decoded direction component, and the number of possible values for the decoded direction component of the motion vector depends on the value of the decoded length component of the motion vector, and the direction-component decoding means selects one of the decoding tables which corresponds to the length component of the motion vector in accordance with the switching signal output from the switching signal output means, and decodes the direction component of the motion vector based on the selected decoding table.

29. A motion vector decoding apparatus as claimed in claim 25, wherein the motion vector synthesizing means converts the length component decoded by the length-component decoding means and the direction component decoded by the direction-component decoding means into horizontal and vertical components in an orthogonal coordinate system.

30. A motion vector decoding apparatus as claimed in claim 25, wherein the direction-component decoding means calculates the direction component of the motion vector according to the direction component information, based on numbers which are previously assigned to a plurality of motion vectors having the same value of the length component.

31. A motion vector encoding apparatus used for a motion-picture encoding method which uses motion-compensating interframe prediction, the motion vector encoding apparatus comprising:

length-component calculating means for calculating a length component of a motion vector when the motion vector is encoded;

length-component determining means for determining the value of the length component of the motion vector;

length-component encoding means for encoding the calculated length component;

direction-component calculating means for calculating a direction component of the motion vector;

encoding-table switching means for selectively determining an encoding table for encoding the direction component of the motion vector, in accordance with the length component; and direction-component encoding means for encoding the calculated direction component based on the selected encoding table.

32. A motion vector decoding apparatus for decoding the motion vector information encoded by the motion vector encoding apparatus as claimed in claim 31, the decoding apparatus comprising:

length-component decoding means for decoding the length component of the motion vector;

length-component determining means for determining the value of the decoded length component;

decoding-table switching means for selectively determining a decoding table for decoding the direction component in accordance with the value of the length component;

direction-component decoding means for decoding the direction component of the motion vector based on the selected decoding table; and vector synthesizing means for synthesizing the motion vector based on the decoded length and direction components.

33. A computer-readable storage medium storing a motion vector encoding program for executing a motion vector encoding operation used in a motion-picture encoding method which uses motion-compensating interframe prediction, the encoding program including:

a first step of calculating a length component of a motion vector;

a second step of encoding the calculated length component and outputting the encoded result as length component information;

a third step of calculating a direction component of the motion vector; and a fourth step of encoding the calculated direction component and outputting the encoded result as direction component information.

34. A computer-readable storage medium storing a motion vector encoding program as claimed in claim 33, wherein the process in the third step is executed after the process of the second step is performed.

35. A computer-readable storage medium storing a motion vector encoding program as claimed in claim 33, the program further including:

a fifth step, executed after the second step, for determining the value of the calculated length component, and wherein if the value of the length component, determined in the fifth step, is not 0, then the operation shifts to the third step, while if the value is 0, then the encoding operation is finished.

36. A computer-readable storage medium storing a motion vector encoding program as claimed in claim 33, wherein in the fourth step:

one of a plurality of encoding tables is selected, the selected table corresponding to the value of the length component calculated in the first step, wherein each encoding table stores codes corresponding to each calculated direction component of the motion vector, and the number of possible values for the direction component of the motion vector depends on the value of the length component of the motion vector, and the direction component of the motion vector, calculated in the third step, is encoded with reference to the selected encoding table.

37. A computer-readable storage medium storing a motion vector encoding program as claimed in claim 33, wherein in the first step:

the length component of the motion vector is calculated using a calculating method selected from the group consisting of the sum of absolute values, the sum of squares, the square root of the sum of squares, and the maximum value with respect to horizontal and vertical components of the motion vector in an orthogonal coordinate system.

38. A computer-readable storage medium storing a motion vector encoding program as claimed in claim 33, wherein in the first step:

the length component of the motion vector is calculated using a plurality of calculating methods selected from the group consisting of the sum of absolute values, the sum of squares, the square root of the sum of squares, and the maximum value with respect to horizontal and vertical components of the motion vector in an orthogonal coordinate system, and the selected calculating methods are switched according to the values of the horizontal and vertical components.

39. A computer-readable storage medium storing a motion vector encoding program as claimed in claim 33, wherein:

in the first step, the length component of the motion vector is calculated based on the values of horizontal and vertical components of the motion vector in an orthogonal coordinate system; and in the third step, the direction component of the motion vector is calculated based on the values of the horizontal and vertical components in the orthogonal coordinate system.

40. A computer-readable storage medium storing a motion vector encoding program as claimed in claim 33, wherein in the fourth step, a number, which was determined as the direction component of the motion vector in the third step, is encoded.

41. A computer-readable storage medium storing a motion vector decoding program for decoding a motion vector which was encoded by executing the motion vector encoding program as claimed in claim 33, the decoding program including:

a sixth step of decoding the length component of the motion vector based on the length component information obtained by the motion vector encoding method;

a seventh step of decoding the direction component of the motion vector based on the direction component information obtained by the motion vector encoding method; and an eighth step of synthesizing the motion vector using the length and direction components decoded in the sixth and seventh steps.

42. A computer-readable storage medium storing a motion vector decoding program as claimed in claim 41, wherein the process in the seventh step is executed after the process of the sixth step is performed.

43. A computer-readable storage medium storing a motion vector decoding program as claimed in claim 41, further comprising:

a ninth step, executed after the sixth step, for determining the value of the decoded length component, and wherein if the value of the length component, determined in the ninth step, is not 0, then the operation shifts to the seventh step, while if the value is 0, then the value of the direction component is set to 0 and the operation jumps to the eighth step.

44. A computer-readable storage medium storing a motion vector decoding program as claimed in claim 42, wherein in the seventh step:

one of a plurality of decoding tables is selected, the selected table corresponding to the value of the length component decoded in the sixth step, wherein each decoding table stores values of the direction component corresponding to the code of the decoded direction component, and the number of possible values for the decoded direction component of the motion vector depends on the value of the decoded length component of the motion vector, and the encoded direction component of the motion vector is decoded with reference to the selected decoding table.

45. A computer-readable storage medium storing a motion vector decoding program as claimed in claim 41, wherein in the eighth step, the length and direction components decoded in the sixth and seventh steps are converted into horizontal and vertical components in an orthogonal coordinate system.

46. A computer-readable storage medium storing a motion vector decoding program as claimed in claim 41, wherein in the seventh step, the direction component of the motion vector is calculated according to the direction component information, based on numbers which are previously assigned to a plurality of motion vectors having the same value of the length component.

47. A computer-readable storage medium storing a motion vector encoding program for executing a motion vector encoding operation used in a motion-picture encoding method which uses motion-compensating interframe prediction, the program including the steps of:

calculating a length component of a motion vector when the motion vector is encoded;

encoding the calculated length component;

determining the value of the calculated length component;

calculating a direction component of the motion vector;

selectively determining the contents of an encoding table for encoding the direction component of the motion vector, in accordance with the determined value of the length component; and encoding the calculated direction component based on the selected encoding table.

48. A computer-readable storage medium storing a motion vector decoding program for decoding a motion vector which was encoded by executing the motion vector encoding program as claimed in claim 47, the decoding program including:

decoding the length component of the motion vector;

determining the value of the length component of the motion vector;

selectively determining the contents of a decoding table for decoding the direction component in accordance with the value of the length component;

decoding the direction component of the motion vector based on the selected decoding table; and synthesizing the motion vector based on the decoded length and direction components.

49. A motion vector encoding method used in a motion-picture encoding method which uses motion-compensating interframe prediction, the motion vector encoding method comprising:

a first step of calculating a length component of a motion vector;

a second step of encoding the calculated length component and outputting the encoded result as a length component information;

a third step of calculating a direction component of the motion vector; and a fourth step of encoding the calculated direction component and outputting the encoded result as direction component information;

wherein in the fourth step, one of a plurality of encoding tables is selected, the selected tables corresponding to the value of the length component calculated in the first step, wherein each encoding table stores codes corresponding to each calculated direction component of the motion vector, and the number of possible values for the direction component of the motion vector depends on the value of the length component of the motion vector, and the direction component of the motion vector calculated in the third step is encoded with reference to the selected encoding table.

50. A motion vector decoding method for decoding a motion vector which was encoded by a motion vector encoding method which uses motion-compensating interframe prediction and includes a first step of calculating a length component of a motion vector, a second step of encoding the calculated length component and outputting the encoded result as a length component information, a third step of calculating a direction component of the motion vector, and a fourth step of encoding the calculated direction component and outputting the encoded result as direction component information, the decoding method comprising:

a fifth step of decoding the length component of the motion vector based on the length component information obtained by the motion vector encoding method;

a sixth step of decoding the direction component of the motion vector based on the direction component information obtained by the motion vector encoding method and performed subsequent to the fifth step;

wherein in the sixth step, one of a plurality of decoding tables is selected, the selected table corresponding to the value of the length component decoded in the fifth step, wherein each decoding table stores values of the direction component corresponding to the code of the decoded direction component, and the number of possible values for the decoded direction component of the motion vector depends on the value of the decoded length component of the motion vector, and the encoded direction component of the motion vector is decoded with reference to the selected decoding table; and a seventh step of synthesizing the motion vector using the length and direction components decoded in the fifth and sixth steps.

51. A motion vector encoding apparatus used for a motion picture encoding method which uses motion-compensating interframe prediction, the motion vector encoding apparatus comprising:

length-component calculating means for calculating a length component of a motion vector;

length-component encoding means for encoding the calculated length component and outputting the encoded result as length component information;

direction-component encoding means for encoding the calculated direction component and outputting the encoded result as direction component information;

switching signal output means for outputting a switching signal in accordance with the length component of the motion vector;

wherein the direction-component encoding means previously stores a plurality of encoding tables, wherein each encoding table stores codes corresponding to each calculated direction component of the motion vector, and the number of possible values for the direction component of the motion vector depends on the value of the length component of the motion vector; and the direction-component encoding means selects one of the encoding tables which corresponds to the length component of the motion vector in accordance with the switching signal output from the switching signal output means and encodes the direction component of the motion vector based on the selected encoding table.

52. A motion vector decoding apparatus for decoding a motion vector encoded by a motion vector encoding apparatus having length-component calculating means for calculating a length component of a motion vector, length-component encoding means for encoding the calculated length component and outputting the encoded result as length component information, and direction-component encoding means for encoding the calculated direction component and outputting the encoded result as direction component information, the decoding apparatus comprising:

length-component decoding means for decoding the length component of the motion vector based on the length component information output from the length-component encoding means;

direction-component decoding means for decoding the direction component of the motion vector based on the direction component information output from the direction-component encoding means after the length-component decoding means decodes the length component of the motion vector;

vector synthesizing means for synthesizing the motion vector using the decoded length and direction components;

switching signal output means for outputting a switching signal in accordance with the decoded length component of the motion vector;

wherein the direction-component decoding means previously stores a plurality of decoding tables, wherein each decoding table stores values of the direction component corresponding to the code of the decoded direction component, and the number of possible values for the decoded direction component of the motion vector depends on the value of the decoded length component of the motion vector; and the direction-component decoding means selects one of the decoding tables which corresponds to the length component of the motion vector in accordance with the switching signal output from the switching signal output means, and decodes the direction component of the motion vector based on the selected decoding table.

53. A computer-readable storage medium storing a motion vector encoding program for executing a motion vector encoding operation used in a motion-picture encoding method which uses motion-compensating interframe prediction, the encoding program including:

a first step of calculating a length component of a motion vector;

a second step of encoding the calculated length component and outputting the encoded result as a length component information;

a third step of calculating a direction component of the motion vector; and a fourth step of encoding the calculated direction component and outputting the encoded result as direction component information;

wherein in the fourth step, one of a plurality of encoding tables is selected, the selected table corresponding to the value of the length component calculated in the first step, wherein each encoding table stores codes corresponding to each calculated direction component of the motion vector, and the number of possible values for the direction component of the motion vector depends on the value of the length component of the motion vector; and the direction component of the motion vector, calculated in the third step, is encoded with reference to the selected encoding table.

54. A computer-readable storage medium storing a motion vector decoding program for decoding a motion vector which was encoded by executing a motion vector encoding operation used in a motion-picture encoding method which uses motion-compensating interframe prediction, the encoding operation including a first step of calculating a length component of a motion vector, a second step of encoding the calculated length component and outputting the encoded result as a length component information, a third step of calculating a direction component of the motion vector, and a fourth step of encoding the calculated direction component and outputting the encoded result as direction component information, the decoding program including:

a fifth step of decoding the length component of the motion vector based on the length component information obtained by the motion vector encoding method;

a sixth step of decoding the direction component of the motion vector based on the direction component information obtained by the motion vector encoding method subsequent to performing the fifth step;

wherein in the sixth step, one of a plurality of decoding tables is selected, the selected table corresponding to the value of the length component decoded in the fifth step, wherein each decoding table stores values of the direction component corresponding to the code of the decoded direction component, and the number of possible values for the decoded direction component of the motion vector depends on the value of the decoded length component of the motion vector, and the encoded direction component of the motion vector is decoded with reference to the selected table; and a seventh step of synthesizing the motion vector using the length and direction components decoded in the fifth and sixth steps.

* * * * *